United States Patent
Morita et al.

(10) Patent No.: US 8,945,452 B2
(45) Date of Patent: Feb. 3, 2015

(54) METHOD FOR PRODUCING FLEXIBLE SHEET

(75) Inventors: Shinnosuke Morita, Tochigi (JP); Kenji Ando, Tochigi (JP)

(73) Assignee: Kao Corporation, Tokyo (JP)

( * ) Notice: Subject to any disclaimer, the term of this patent is extended or adjusted under 35 U.S.C. 154(b) by 318 days.

(21) Appl. No.: 13/498,822

(22) PCT Filed: Sep. 29, 2010

(86) PCT No.: PCT/JP2010/066888
§ 371 (c)(1),
(2), (4) Date: Mar. 28, 2012

(87) PCT Pub. No.: WO2011/043228
PCT Pub. Date: Apr. 14, 2011

(65) Prior Publication Data
US 2012/0181722 A1    Jul. 19, 2012

(30) Foreign Application Priority Data
Oct. 9, 2009    (JP) ................................ 2009-235050

(51) Int. Cl.
*D03D 3/00*    (2006.01)
*D06C 3/06*    (2006.01)
*B29C 55/18*    (2006.01)
*D04H 1/56*    (2006.01)

(52) U.S. Cl.
CPC . *D06C 3/06* (2013.01); *B29C 55/18* (2013.01); *D04H 1/56* (2013.01)
USPC ...................................... 264/288.4; 264/175

(58) Field of Classification Search
CPC ................................. B29C 55/06; B29C 55/18
USPC ................................................ 264/288.4, 175
See application file for complete search history.

(56) References Cited

U.S. PATENT DOCUMENTS

| | | |
|---|---|---|
| 3,636,600 A | 1/1972 | Mertens |
| 3,849,526 A | 11/1974 | Muller et al. |
| 3,969,473 A * | 7/1976 | Meek ............................ 264/505 |
| 4,153,664 A | 5/1979 | Sabee |
| 4,153,751 A | 5/1979 | Schwarz |
| 4,285,100 A | 8/1981 | Schwarz |

(Continued)

FOREIGN PATENT DOCUMENTS

| | | |
|---|---|---|
| CN | 1675050 A | 9/2005 |
| CN | 101031680 A | 9/2007 |

(Continued)

OTHER PUBLICATIONS

Akagi et al., JP 2009228145 A, machine translation, Oct. 8, 2009.*

(Continued)

*Primary Examiner* — Galen Hauth
(74) *Attorney, Agent, or Firm* — Birch, Stewart, Kolasch & Birch, LLP

(57) ABSTRACT

A method for producing a flexible sheet includes a stretching step in which a base sheet (10) is fed from between a pair of first drive rollers (42, 43) into the bite of a pair of intermeshing corrugated rollers (2, 3) and stretched in the machine direction between the corrugated rollers (2, 3). In the method, the peripheral velocity V1 of the first drive rollers (42, 43) and the peripheral velocity V2 of the corrugated rollers (2, 3) have a relation of V1>V2.

5 Claims, 1 Drawing Sheet

(56) References Cited

U.S. PATENT DOCUMENTS

| | | | |
|---|---|---|---|
| 6,039,555 | A | 3/2000 | Tsuji et al. |
| 6,203,654 | B1 | 3/2001 | McFall et al. |
| 6,605,172 | B1 | 8/2003 | Anderson et al. |
| 6,726,870 | B1 | 4/2004 | Benson et al. |
| 6,953,510 | B1 | 10/2005 | Mackay et al. |
| 8,012,388 | B2 * | 9/2011 | Akaki et al. ............... 264/40.1 |
| 2001/0029141 | A1 | 10/2001 | Mizutani et al. |
| 2004/0140047 | A1 | 7/2004 | Sato et al. |
| 2005/0010188 | A1 | 1/2005 | Glaug et al. |
| 2005/0101216 | A1 | 5/2005 | Middlesworth et al. |
| 2005/0133151 | A1 | 6/2005 | Maldonado Pacheco et al. |
| 2006/0151914 | A1 | 7/2006 | Gerndt et al. |
| 2010/0065984 | A1 * | 3/2010 | Akaki et al. ............... 264/288.4 |
| 2010/0622311 | | 3/2010 | Abed et al. |
| 2010/0145295 | A1 | 6/2010 | Isele et al. |
| 2011/0042849 | A1 | 2/2011 | Akaki et al. |

FOREIGN PATENT DOCUMENTS

| | | |
|---|---|---|
| CN | 101535549 A | 9/2009 |
| DE | 1 785 027 A1 | 1/1972 |
| EP | 0411857 A1 | 2/1991 |
| GB | 477428 A | 4/1937 |
| JP | 8-300498 A | 11/1996 |
| JP | 9-220427 A | 8/1997 |
| JP | 9-234221 A | 9/1997 |
| JP | 2001-509420 A | 7/2001 |
| JP | 2001-328191 A | 11/2001 |
| JP | 2002-501127 A | 1/2002 |
| JP | 2003-73967 A | 3/2003 |
| JP | 2003-153946 A | 5/2003 |
| JP | 2004-174234 A | 6/2004 |
| JP | 2005-111908 A | 4/2005 |
| JP | 2008-38304 A | 2/2008 |
| JP | 2008-509020 A | 3/2008 |
| JP | 2008-156785 A | 7/2008 |
| JP | 2009-228145 A | 10/2009 |
| WO | WO 99/02114 A1 | 1/1999 |
| WO | WO 99/37839-1 | 7/1999 |
| WO | WO 03/070140 A1 | 8/2003 |
| WO | WO 2004/020174 A1 | 3/2004 |
| WO | 2004/038085 A2 | 5/2004 |
| WO | WO 2008078533 A1 * | 7/2008 |

OTHER PUBLICATIONS

United States Office Action for copending U.S. Appl. No. 12/085,146 dated Jun. 7, 2013.
Chinese Office Action dated Sep. 3, 2010 for Chinese Application No. 200680042632.8 with English translation.
Extended European Search Report dated Jul. 6, 2009 for European Application No. 06822474.0.
International Preliminary Report on Patentability, and Translation of Written Opinion of the International Searching Authority, dated Jun. 3, 2008 for International Application No. PCT/JP2006/321513 (Forms PCT/IB/373 and PCT/ISA/237).
International Search Report dated Feb. 6, 2007 for International Application No. PCT/JP2006/321513 (PCT/ISA/210).
Japanese Notice dated Jan. 17, 2012 for Japanese Application No. 2006-288019 with English translation.
Japanese Notice dated Jul. 10, 2012 for Japanese Application No. 2009-235050 with English translation.
Japanese Office Action dated Jun. 21, 2011 for Japanese Application No. 2006-288019 with English translation.
Japanese Submission of Publications dated Dec. 28, 2011 for Japanese Application No. 2006-288019 with English translation.
Japanese Submission of Publications dated Jun. 29, 2012 for Japanese Application No. 2009-235050 with English translation.
39 Office Action dated Aug. 2, 2012 for U.S. Appl. No. 12/085,146.
Office Action dated Feb. 3, 2011 for U.S. Appl. No. 12/085,146.
Office Action dated Feb. 9, 2012 for U.S. Appl. No. 12/085,146.
Office Action dated Sep. 16, 2010 for U.S. Appl. No. 12/085,146.
PCT/ISA/210—International Search Report dated Dec. 28, 2010, issued in PCT/JP2010/066888.
Communication of a notice of opposition for European Patent Application No. 06822474.0. dated Sep. 21, 2012.
Computer-generated English translation for JP-2003-153946, published May 27, 2003.
Notification of the First Office Action for corresponding Chinese Patent Application No. 201080041145.6, dated Feb. 5, 2013.
International Preliminary Report on Patentability for International Patent Application No. PCT/JP2010/066886, mailed May 24, 2012.
Final Office Action for copending U.S. Appl. No. 12/085,146, dated Dec. 17, 2012.

* cited by examiner

METHOD FOR PRODUCING FLEXIBLE SHEET

TECHNICAL FIELD

The present invention relates to a method for producing a flexible sheet.

BACKGROUND ART

Various techniques of sheet processing using a processing section including a pair of corrugated rollers have been proposed, in which a sheet such as nonwoven fabric is introduced into a bite between a counterrotating pair of corrugated rollers each having ridges extending on the peripheral surface parallel to the axis of rotation in intermeshing engagement with each other.

For example, patent literature 1 below proposes a method for stretching a sheet such as nonwoven fabric by adjusting the depth of engagement of the roller ridges.

When a sheet is subjected to stretch processing by the passage between a pair of corrugated rollers as in the method disclosed in patent literature 1, although a high stretch ratio can be reached by increasing the depth of engagement, an increase in depth of engagement tends to result in reduction of sheet strength.

Patent literature 2 below proposes a technique for performing high stretch ratio processing in which the depth of engagement of gear rollers is adjusted and, in addition, the sheet such as nonwoven fabric is preliminarily stretched by stretching rollers prior to the stretching between the gear rollers.

According to the technique of patent literature 2, however, because the rotational velocity of the pair of gear rollers is set higher than that of the upstream stretching rollers, a tension in the machine direction is added to the sheet such as nonwoven fabric so that the sheet reduces in width before being stretched between the gear rollers. Also, because of the high rotational velocity of the pair of gear rollers, the depth of grooves between ridges cannot be set large enough to provide the resulting stretchable sheet with improved feel to the touch.
Patent literature 1: JP 2003-73967A
Patent literature 2: US 2010065984A1

SUMMARY OF INVENTION

The invention relates to a method for producing a flexible sheet having high flexibility and superior feel to the touch without involving reduction in sheet width.

The invention provides a method for producing a flexible sheet including a stretching step in which a base sheet is fed from between a pair of first drive rollers into the bite between a pair of intermeshing corrugated rollers to be stretched in the machine direction.

The invention also provides a method for producing a flexible sheet in which the peripheral velocity V1 of the first drive rollers and the peripheral velocity V2 of the corrugated rollers have a relation of V1>V2.

DESCRIPTION OF EMBODIMENTS

The method of producing a flexible sheet according to the invention will be described based on its preferred embodiments with reference to the accompanying drawings.

Figure 1:
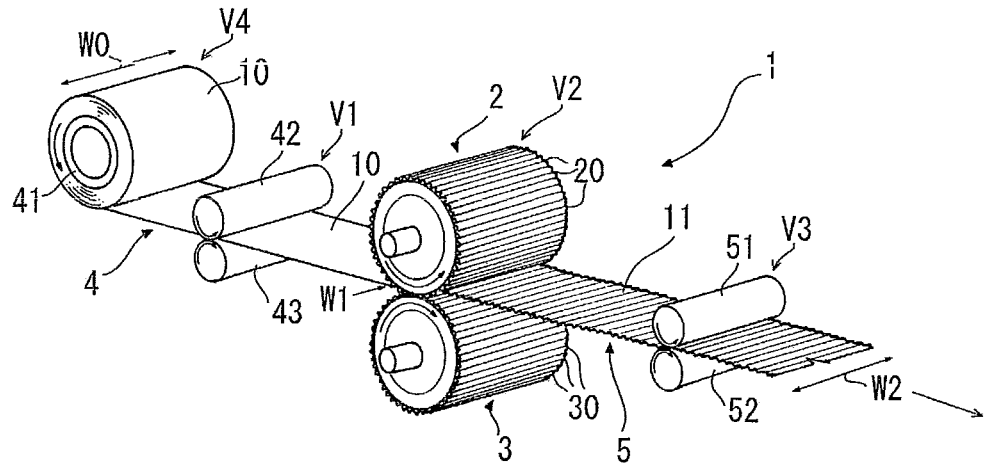
FIG. 1 schematically illustrates an embodiment of the sheet processing section used in the method of the invention and the method for producing a sheet using the processing section.
Figure 2:
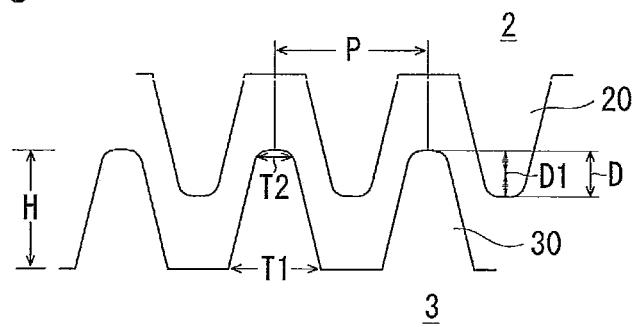
FIG. 2 is an enlarged view of a pair of rollers used in the processing section shown in FIG. 1.
Figure 3:
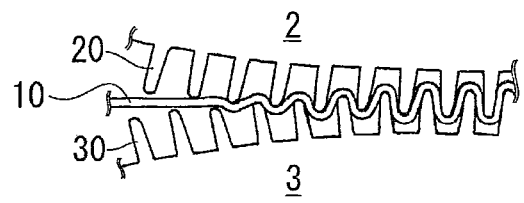
FIG. 3 schematically illustrates a base sheet being stretched between the pair of rollers used in the processing section shown in FIG. 1.

FIGS. 1 through 3 schematically illustrate an embodiment of a processing section used in the method of the invention.

As shown in FIG. 1, the processing section 1 of the present embodiment includes a pair of corrugated rollers 2, 3 having intermeshing ridges on their peripheral surface parallel to their rotational axis. The processing section 1 is configured such that a base sheet 10 fed into the bite of the rotating corrugated rollers 2, 3 is stretched in the machine direction to be endowed with flexibility. The corrugated rollers 2, 3 used in the processing section 1 of the present embodiment have the same construction. As used herein, the expression "having intermeshing ridges on their peripheral surface parallel to their rotational axis" means that the corrugated rollers 2, 3 have ridges 20 and ridges 30, respectively, and grooves alternating on their peripheral surface parallel to their rotating axes and that, at the bite of the corrugated rollers 2, 3, the ridge of one of the rollers bite into the groove of the other as shown in FIG. 1.

The corrugated rollers 2, 3 are preferably configured to stretch the base sheet 10 at a stretch ratio of 1.1 to 5.0, more preferably 1.5 to 3.0, in view of the improvement on flexibility and retention of the strength of the base sheet 11 after the stretching. The stretch ratio after the stretch processing is obtained from the pitch P of the ridges 20, 30 and the engagement depth D of the corrugated rollers 2, 3 (see FIG. 2) according to equation 1:

$$\text{Stretch Ratio} = \frac{\sqrt{P^2 + 4D^2}}{P} \quad \text{[Math. 1]}$$

In order to achieve a stretch ratio in the above recited range, it is preferred that the pitch P of the ridges 20 of the corrugated roller 2 and of the ridges 30 of the corrugated roller 3 be 1.0 to 5.0 mm; the width T1 of the ridge 20 and of the ridge 30 at the root be less than a half the pitch; and the height H of the ridge 20 and of the ridge 30 be equal to or more than the pitch. As used herein, the term "pitch P" denotes the distance between the centerline of a ridge to the centerline of an adjacent ridge. As used herein, the term "width of the ridge" of a corrugated roller denotes the width of one ridge. Each ridge does not need to have a uniform width over its height and may be tapered toward the top thereof to depict a trapezoidal cross-section. As used herein, the term "height of the ridge" denotes the distance from the root to the top of a ridge.

Taking uniformity of elongation into consideration, the pitch P of the ridges of the corrugated rollers 2, 3 is more preferably 1.5 to 3.5 mm, even more preferably 2.0 to 3.0 mm. Taking the strength of the ridges into consideration, the width T1 of the ridges at the root of the corrugated rollers 2, 3 is preferably 0.25 to less than 0.5 times the pitch P, more preferably 0.3 to 0.4 times the pitch P. In order to achieve a high stretch ratio to provide a sheet with high flexibility, the height H of the ridges of each corrugated roller is preferably 1.0 to 2.0 times the pitch P, more preferably 1.25 to 1.75 times the pitch P. In the case of trapezoidal ridges, it is preferred that the width T1 at the root of each ridge in each corrugated roller 2 or 3 be in the above recited range and that, in terms of the strength of the ridges, the width T2 at the top of each ridge in each corrugated roller 2 or 3 be 0.2 to 0.45 times the pitch P.

The edges of the ridges 20, 30 of the corrugated rollers 2, 3 are preferably rounded off as shown in FIG. 2 so as not to damage the base sheet 10. The radius of curvature of the rounded edge is preferably 0.1 to 0.3 mm. The above recited values as for the width T2 of the corrugated rollers 2, 3 are those measured before rounding off.

From the viewpoint of obtaining a sheet with good flexibility, the engagement depth D between the ridges 20, 30 of the corrugated rollers 2, 3 (see FIG. 2) is preferably 1.0 mm or more, more preferably 2.0 mm or more, when the pitch P is in the range recited above. From the same viewpoint, the engagement depth D is preferably equal to or greater than the pitch P. As used herein, the term "engagement depth D of the ridges" denotes the distance between the top faces of adjacent mating ridges 20, 30 of counterrotating intermeshing corrugated rollers 2, 3.

A driving force from a driving unit (not shown) is transmitted to the shaft of either one of the corrugated rollers 2, 3 to counterrotate the two rollers in meshing engagement with each other. Apart from the ridges 20, 30, a general gear specified in JIS B1701 may be fitted as a driving gear to the shaft of each of the corrugated rollers 2, 3. In this configuration, the rollers 2, 3 are rotated not by interlocking between the ridges 20 of the roller 2 and the ridges 30 of the roller 3 but by transmitting a driving force to the rollers through the engagement of these gears. In this case, the ridges 20, of the respective corrugated rollers 2, 3 are not brought into contact.

As shown in FIG. 1, the sheet processing section that can be used in the present embodiment includes a feed roller 41 having a roll of a base sheet 10 thereon upstream the corrugated rollers 2, 3, a pair of first drive rollers 42, 43 between the feed roller 41 and the corrugated rollers 2, 3, an unshown tension sensor disposed on the transport path between the corrugated rollers 2, 3 and the first drive rollers 42, 43, and an unshown controller controlling the peripheral velocity V1 of the first drive rollers 42, 43 based on the output from the tension sensor. The controller adjusts the peripheral velocity V1 of the first drive rollers 42, 43 based on the output from the tension sensor to a predetermined value in relation to the peripheral velocity V2 of the intermeshing corrugated rollers 2, 3 so as to apply a desired tension to the base sheet 10. More specifically, when the detected tension is greater than a desired tension, the controller operates to slightly increase the peripheral velocity V1 of the first drive rollers 42, 43 relative to the peripheral velocity V2 of the corrugated rollers 2, 3, whereby the tension in this part of the transport path decreases to approach the desired tension. When, on the other hand, the detected tension is smaller than a desired tension, the controller operates to slightly reduce the peripheral velocity V1 of the first drive rollers 42, 43 relative to the peripheral velocity V2 of the corrugated rollers 2, 3, whereby the tension in this part of the transport path increases to approach the desired tension.

Application of a desired tension to the base sheet 10 may be achieved by adjusting the peripheral velocity V1 of the first drive rollers 42, 43 in relation to the feed velocity V4 of the base sheet 10 unrolled from the feed roller 41.

As shown in FIG. 1, the sheet processing section further includes a pair of second drive rollers 51, 52 downstream the corrugated rollers 2, 3, an unshown tension sensor between the second drive rollers 512 and 52 and the corrugated rollers 2, 3, and an unshown controller for controlling the peripheral velocity of the second drive rollers 51, 52 based on the output from the tension sensor. The second drive rollers 51, 52 take off the stretched base sheet 11 from between the corrugated rollers 2, 3, and covey the base sheet 11 to next step. The controller operates to adjust the peripheral velocity V3 of the second drive rollers 51, 52 to a predetermined velocity in relation to the peripheral velocity V2 of the corrugated rollers 2, 3 based on the output from the tension sensor, whereby the second drive rollers 51, 52 taken off the stretched base sheet 11 from between the corrugated rollers 2, 3 while applying a desired tension to the sheet 11. More specifically, when the detected tension is greater than a desired tension, the controller operates to slightly reduce the peripheral velocity V3 of the second drive rollers 51, 52 in relation to the peripheral velocity V2 of the corrugated rollers 2, 3, whereby the tension in this part of the transport path decreases to approach the desired tension. When, on the other hand, the detected tension is smaller than a desired tension, the controller operates to slightly increase the peripheral velocity V3 of the second drive rollers 51, 52 in relation to the peripheral velocity V2 of the corrugated rollers 2, 3, whereby the tension in this part of the transport path increases to approach the desired tension.

The peripheral velocity V1 of the first drive rollers 42, 43 is the velocity of the surface of each roller 42 or 43. The feed velocity V4 of the base sheet 10 unrolled from the feed roller 41 is the velocity at the surface of the unrolled base sheet 10. The peripheral velocity V3 of the second drive rollers 51, 52 is the velocity of the surface of each roller 51 or 52 similarly to the peripheral velocity V1 of the first drive rollers 42, 43. The peripheral velocity V2 of the corrugated rollers 2, 3 is the velocity not at the top of the ridges 20, 30 but at a position D1 radially inward from the top of the ridges 20, 30 by a distance equal to half the engagement depth D of the ridges 20, 30 (half the distance between the top faces of adjacent mating ridges) as shown in FIG. 2.

The processing section 1 has unshown controlling means that operates to drive the above-described driving means, detect the tension with the tension sensors, and control the velocities of the feed roller 41, the first drive rollers 42, 43, the corrugated rollers 2, 3, and the second drive rollers 51, 52 based on the detected tensions in accordance with the prescribed operational sequence.

An exemplary embodiment of the method for producing a flexible sheet according to the invention will be described based on a method in which a base sheet is processed into a flexible sheet by the use of the processing section 1.

As shown in FIG. 1, the method for producing a flexible sheet according to the invention includes the step of stretching, in which a base sheet 10 is fed from the base sheet roll into the nip of the pair of first drive rollers 42, 43, introduced from the pair of first drive rollers 42, 43 into the bite between the pair of corrugated rollers 2, 3 to be stretched in the machine direction. The method according to the present embodiment further includes the step of taking off the stretched based sheet 11 from between the pair of corrugated rollers 2, 3, in which step the stretched base sheet 11 is conveyed to the nip between the pair of second drive rollers 51, 52, whereby it is taken off under tension applied by the pair of second drive rollers 51, 52 in the machine direction.

The steps of stretching and taking off will be described.

In a step preceding the stretching step, the base sheet 10 is fed from the feed roller 41 to the first drive rollers 42, 43. In the present embodiment, the peripheral velocity V1 of the first drive rollers 42, 43 and the feed velocity V4 of the base sheet 10 (hereinafter "base sheet feed velocity V4") are equal (V1=V4) at the time of feeding the base sheet 10. In the stretching step the base sheet 10 is fed from between the pair of first drive rollers 42, 43 into the bite of the co-rotating pair of corrugated rollers 2, 3 of the processing section 1 to be stretched in the machine direction as shown in FIGS. 1 and 3. The peripheral velocity V1 of the first drive rollers 42, 43 is set higher than the peripheral velocity V2 of the corrugated rollers 2, 3, whereby the base sheet 10 may be fed into the bite between the corrugated rollers 2, 3 under tension without being accompanied by reduction in its width due to contraction before reaching the corrugated rollers 2, 3. With the peripheral velocity V1 of the first drive rollers 42, 43 being higher than the peripheral velocity V2 of the corrugated rollers 2, 3 (V1>V2), in other words, with the peripheral velocity V2 of the corrugated rollers 2, 3 being lower than the peripheral velocity V1 of the first drive rollers 42, 43, a tension more than necessary is prevented from being applied to the base sheet 10 under tension. This penults a large engagement depth D of the ridges 20, 30 of the corrugated rollers 2, 3 as discussed above. From this point of view, the ratio of the peripheral velocity V2 of the corrugated rollers 2, 3 to the peripheral velocity V1 of the first drive rollers 42, 43, (V2/V1)×100, is preferably 60% to 90%, more preferably 70% to 85%, even more preferably 70% to 80%. In the stretching step, while the peripheral velocity V2 of the corrugated rollers 2, 3 is lower than the peripheral velocity V1 of the first drive rollers 42, 43, the base sheet 10 is fed to the bite between the corrugated rollers 2, 3 without slacking because of the large engagement depth D of the ridges 20, 30 of the corrugated rollers 2, 3.

The tension applied to the base sheet 10 is preferably 10% to 50%, more preferably 10% to 40%, of the breaking load of the base sheet 10. When the base sheet 10 has a breaking load of about 60 N per 100 mm width, for example, the tension to be applied before stretch processing is preferably 6 to 30 N, more preferably 6 to 24 N, per 100 mm width. If the tension is too small, stretch processing can fail to provide the base sheet with sufficient stretchability. If the tension is too large, on the other hand, the sheet material may be elongated in this part of transport path and thereby contracted in width, which can result in the failure of obtaining a stretched sheet with a desired width.

In the taking-off step, the stretched base sheet 11, that has been stretched between the corrugated rollers 2, 3, is fed to the nip between the rotating pair of second drive rollers 51, 52 of the processing section 1 and thereby taken off from the pair of corrugated rollers 2, 3 under tension applied in the machine direction. Specifically, the peripheral velocity V3 of the second drive rollers 51, 52 is preferably set higher than the peripheral velocity V2 of the corrugated rollers 2, 3 (V3>V2) to apply a desired tension to the base sheet 11. The peripheral velocity difference ΔV between the peripheral velocity V3 of the second drive rollers 51, 52 and the peripheral velocity 2 of the corrugated rollers 2, 3 (V3−V2) results in application of tension to the base sheet 11. In order to take off the base sheet 11 from between the pair of corrugated rollers 2, 3 under tension, the ratio of the peripheral velocity V2 to the peripheral velocity V3 of the second drive rollers 51, 52, (V2/V3)×100, is preferably 10% to 90%, more preferably 30% to 70%, even more preferably 30% to 50%. It is also preferred that the peripheral velocity V3 of the second drive rollers 51, 52 be higher than the peripheral velocity V1 of the first drive rollers 42, 43 (V3>V1). The ratio of the peripheral velocity V1 of the first drive rollers 42, 43 to the peripheral velocity V3 of the second drive rollers 51, 52, (V1/V3)×100, is preferably 30% to 80%, more preferably 40% to 60%. The tension to be applied is preferably 5% to 50%, more preferably 5% to 20%, of the breaking load of the stretched base sheet 11.

Taking the reduction in sheet strength due to stretching into consideration, it is preferred that the tension applied during the transport of the stretched base sheet 11 be decided based on the breaking load of the stretched base sheet 11 (the base sheet 10 after the stretch processing) so as to avoid breakage of the taken-off base sheet 11. That is, the tension of the base sheet to be fed to the second drive rollers 51, 52 downstream the stretching step be smaller than that of the base sheet to be fed to the first drive rollers 42, 43 upstream the stretching step.

The base sheet 10 to be processed is not particularly limited and includes, for example, paper, a single layer of nonwoven, a resin film, a laminate of two or more layers of nonwoven, and a laminate of a resin film and nonwoven. The base sheet 10 is exemplified by thermoplastic polymer nonwovens made of polyolefin fibers selected from polypropylene fibers, fibers of a polypropylene/polyethylene mixture, and polypropylene/polyethylene bicomponent fibers. Nonwoven fabric containing elastic fibers is suited to be provided with not only flexibility but stretchability by the stretch processing using the processing section 1. The nonwoven fabric containing elastic fibers is exemplified by a stretch sheet composed of an elastic fiber layer containing elastic fibers laminated on at least one side thereof with an inelastic fiber layer made of substantially inelastic fibers, the two fiber layers being joined by fusion bonding in a manner that the fibers constituting the elastic fiber layer retain their fibrous form (hereinafter referred to as a stretch composite nonwoven fabric) and a stretch nonwoven fabric composed of a number of elastic filaments arranged to extend in one direction without intersecting with one another and bonded in a substantially unstretched state over their whole length to an extensible nonwoven fabric.

The elastic fibers can be those made of elastic resins, including thermoplastic elastomers, such as styrene elastomers, polyolefin elastomers, polyester elastomers, and polyurethane elastomers, and rubber. The inelastic fibers can be of polyethylene (PE), polypropylene (PP), polyester (e.g., PET or PBT), polyamide, and the so forth.

Various known stretch composite nonwoven fabrics are useful, including the stretch sheet of JP 2008-179128A, the stretch sheet of JP 2007-22066A, a stretch nonwoven fabric made by the method of JP 2007-22066A, and the laminate sheet of Japanese patent 3054930.

As described above, according to the method of producing a flexible sheet of the present embodiment, in which a base sheet is processed to have flexibility using the processing section 1, application of tension more than necessary to the tensioned base sheet is prevented by setting the peripheral velocity V1 of the first drive rollers 42, 43 higher than the peripheral velocity V2 of the corrugated rollers 2, 3 (V1>V2), in other words, by setting the peripheral velocity V2 of the corrugated rollers 2, 3 lower than the peripheral velocity V1 of the first drive rollers 42, 43. As a result, the base sheet 10 is prevented from undesirably contracting its width W1 immediately before coming between the corrugated rollers 2, 3. Specifically, the achievable ratio of the width W2 of the resulting flexible sheet (the base sheet after stretch processing) to the initial width W0 of the base sheet 10, (W2/W1)×100, may be 80% or more (see FIG. 1). Thus, there is almost no loss of material due to contraction from the initial width of the base sheet 10, bringing about improved economic efficiency.

According to the method of producing a flexible sheet of the present embodiment, the tension imposed on the tensioned base sheet is lowered by setting the peripheral velocity V2 of the corrugated rollers 2, 3 lower than the peripheral velocity V1 of the first drive rollers 42, 43. Therefore, the base sheet is less prone to damages, such as breakage or reduction in strength, by the corrugated rollers 2, 3 during the stretch processing, and the engagement depth D of the ridges 20, 30 of the corrugated rollers 2, 3 is allowed to be increased.

Accordingly, the flexible sheet obtained by the method of the present embodiment exhibits good cushioning properties, improved flexibility, and improved feel to the touch.

The method of producing a flexible sheet of the invention is by no means limited to the above described embodiment, and various modifications may be made therein as follows.

While the processing section 1 used in the above embodiment has one pair of corrugated rollers 2, 3 to carry out the stretching step as shown FIG. 1, a plurality of the pairs may be arranged along the machine direction to repeatedly subject the base sheet 10 to the stretching step to impart higher flexibility to the base sheet 10.

While in the above embodiment the peripheral velocity V1 of the first drive rollers 42, 43 and the base sheet feed velocity V4 are equal (V1=V4), the peripheral velocity V1 of the first drive rollers 42, 43 may be set higher than the base sheet feed velocity V4 to preliminarily stretch the base sheet 10 prior to the stretching step. That is, the base sheet 10 may be preliminarily stretched by the peripheral velocity difference ΔV (=V1−V4) between the peripheral velocity V1 of the first drive rollers 42, 43 and the base sheet feed velocity V4. The ratio of the base sheet feed velocity V4 to the peripheral velocity V1 of the first drive rollers 42, 43, (V4/V1)×100, is preferably 80% to 100%, more preferably 90% to 98%. The tension to be applied is preferably 10% to 50%, more preferably 10% to 20%, of the breaking load of the base sheet 10. When the base sheet 10 has a breaking load of, for example, about 60 N per 100 mm width, the tension to be applied before the stretch processing is preferably 6 to 30 N, more preferably 6 to 12 N, per 100 mm width.

The processing section 1 used in the above embodiment may be provided with a heater, if necessary. Specifically, any of the first drive rollers 42, 43, the second drive rollers 51, 52, and the corrugated rollers 2, 3 shown in FIG. 1 may be equipped with a heater. Heat application to the sheet by equipping the first drive rollers 42, 43, the second drive rollers 51, 52, and the corrugated rollers 2, 3 with the respective heaters will make the sheet more deformable and stretchable without damage.

Where necessary, the processing section 1 used in the above embodiment may be equipped with a suction unit. Specifically, the first drive rollers 42, 43 and the second drive rollers 51, 52 as shown in FIG. 1 may have openings around their peripheral surface and suction passageways in the inside thereof which interconnect the openings and a suction device outside the rollers, whereby the processed sheet is conveyed while being sucked onto the peripheral surface of the rollers.

The flexible sheet produced by the method of the invention is suited for use as a material making up absorbent articles typified by disposable diapers, sanitary napkins, and bodily fluid absorbent pads, and the like, such as a topsheet, a backsheet, a standing gather, and an outer cover.

EXAMPLES

The invention will now be shown in greater detail with reference to Examples, but it should be understood that the invention is not limited thereto.

Flexible sheets were produced using the processing section shown in FIG. 1. Flexible sheets of Examples 1 to 5 were obtained using an apparatus including corrugated rollers specified below. A base sheet specified below was passed once through the pairs of rollers under the conditions described below. The resulting flexible sheets were evaluated as described below. The results obtained are shown in Table 1.

Example 1

(a) Geometry of Corrugated Rollers and Depth of Engagement of Ridges

Common to Rollers 2 and 3

Pitch P of ridges of corrugated rollers: 2.0 mm
Width T1 of ridges of rollers: 0.7 mm (at the root); width T2: 0.5 mm (at the top)
Height H of ridges of rollers: 3.5 mm
P.C.D (pitch circle diameter) of ridges of rollers: 150 mm
Engagement depth D of ridges of rollers: 3.0 mm (the two rollers counterrotate with their ridges in contact intermeshing relation)

(b) Material of Base Sheet

The base sheet to be processed was a web of stretch composite nonwoven fabric composed of a number of elastic filaments arranged to extend in one direction without intersecting with one another and bonded in a substantially unstretched state over their whole length to an extensible nonwoven fabric.
Elastic filament: thermoplastic styrene elastomer fibers having a fiber thickness of 30 μm
Basis weight of elastic filament layer: 40 g/m$^2$
Extensible nonwoven fabric: PE sheath/PET core bicomponent fibers having a fiber thickness of 2 dtex
Basis weight of extensible nonwoven fabric: 10 g/m$^2$
Basis weight of composite sheet: 50 g/m$^2$
Width of base sheet before processing: 250 mm The ratios of peripheral velocities and the tension applied to the base sheet were set as shown in Table 1 to carry out processing of the base sheet. As is obvious from Table 1, Example 1 is characterized in that the peripheral velocity V1 of the first drive rollers is higher than the peripheral velocity V2 of the corrugated rollers.

Example 2

The same base sheet as used in Example 1 was processed using the same corrugated rollers as used in Example 1, except that the engagement depth D of the ridges was changed to 2.8 mm. The ratios of peripheral velocities and the tension applied to the base sheet were set as shown in Table 1.

Example 3

The same base sheet as used in Example 1 was processed using the same corrugated rollers as used in Example 1, except that the engagement depth D of the ridges was changed to 2.6 mm. The ratios of peripheral velocities and the tension applied to the base sheet were set as shown in Table 1.

Example 4

The same base sheet as used in Example 1 was processed using the same corrugated rollers as used in Example 1, except that the engagement depth D of the ridges was changed to 2.4 mm. The ratios of peripheral velocities and the tension applied to the base sheet were set as shown in Table 1.

Example 5

The same base sheet as used in Example 1 was processed using the same corrugated rollers as used in Example 1, except that the engagement depth D of the ridges was changed to 2.2 mm. The ratios of peripheral velocities and the tension applied to the base sheet were set as shown in Table 1.

Comparative Example 1

The same base sheet as used in Example 1 was processed using the same corrugated rollers as used in Example 1, except that the engagement depth D of the ridges was changed to 2.0 mm. The ratios of peripheral velocities and the tension applied to the base sheet were set as shown in Table 1. As is obvious from Table 1, Comparative Example 1 is characterized in that the peripheral velocity V2 of the corrugated rollers is higher than the peripheral velocity V1 of the first drive rollers unlike Example 1.

Comparative Example 2

The same base sheet as used in Example 1 was processed using the same corrugated rollers as used in Example 1, except that the engagement depth D of the ridges was changed to 1.8 mm. The ratios of peripheral velocities and the tension applied to the base sheet were set as shown in Table 1. As is obvious from Table 1, Comparative Example 2 is characterized in that the peripheral velocity V2 of the corrugated rollers is higher than the peripheral velocity V1 of the first drive rollers unlike Example 1.

Evaluation:

In the production of flexible sheets under the conditions of Examples and Comparative Examples, the ratio of the width W1 of the base sheet immediately before coming between the corrugated rollers to the initial width W0 of the base sheet, (W1/W0)×100, and the ratio of the width W2 of the flexible sheet obtained after the processing to the initial width W0 of the base sheet, (W2/W0)×100, were obtained. Each of the flexible sheets obtained in Examples and Comparative Examples was evaluated in terms of thickness, cushioning properties, and load (strength) at 120% elongation in accordance with the following methods.

(1) Thickness

The flexible sheet obtained in Examples and Comparative Examples was sandwiched in between flat plates under a load of 0.5 cN/cm$^2$, and the distance between the plates was measured with a laser displacement meter LK-G030 (from Keyence Corp.). Specifically, the total thickness (height) of the two plates was measured before and after placing the sheet therebetween, and the difference was obtained as the thickness of the sheet.

(2) Cushioning Properties

The flexible sheet obtained in Examples and Comparative Examples was cut to a square measuring at least 2 cm on a side and left to stand for at least 24 hours to remove strain from the sheet before testing. The thus prepared specimen was compressed at a compression rate of 0.02 mm/sec until a maximum load of 50 gf/cm$^2$ was reached using a compression tester and then recovered from the load at the same rate until the load returned to zero. A compression recovery (%) as a measure of cushioning properties was calculated from the compression work (a) and the recovery work (b) according to the formula: (b/a)×100(%). The test was performed using a handy-type compression tester from Kato Tech Co., Ltd. under conditions: compression plate (circular): 2 cm$^2$; auto-return; and amplifier sensitivity: SENS 2, stroke set 5.0. The data was processed using the measurement program for handy type compression tester.

(3) Stress at 120% Elongation

The flexible sheet obtained in Examples and Comparative Examples was cut to a length of 200 mm along the machine direction and a width of 25 mm along the cross-machine direction to make a specimen. The specimen was set on a tensile tester AG-1kNID from Shimadzu Corp. at an initial jaw separation of 150 mm and pulled in the longitudinal direction at a speed of 300 mm/min to determine load-elongation characteristics. The measurement was repeated using three specimens per sample sheet to obtain an average stress at 120% elongation.

TABLE 1

|  | Engagement Depth D (mm) | V2/V1 (%) | V2/V3 (%) | V1/V3 (%) | W1/W0 (%) | W2/W0 (%) | Thickness (mm) | Cushioning Properties (%) | Strength at 120% Elongation (N/25 mm) |
|---|---|---|---|---|---|---|---|---|---|
| Example 1 | 3.0 | 73.0 | 36.5 | 50.0 | 98.0 | 97.6 | 0.85 | 41.5 | 6.4 |
| Example 2 | 2.8 | 77.4 | 38.7 | 50.0 | 97.2 | 97.2 | 0.81 | 41.2 | 6.3 |
| Example 3 | 2.6 | 82.4 | 41.2 | 50.0 | 94.0 | 94.0 | 0.77 | 41.3 | 6.3 |
| Example 4 | 2.4 | 88.0 | 44.0 | 50.0 | 91.2 | 90.4 | 0.70 | 40.5 | 6.4 |
| Example 5 | 2.2 | 94.8 | 47.4 | 50.0 | 87.2 | 87.2 | 0.66 | 40.2 | 6.3 |
| Compara. Example 1 | 2.0 | 102.2 | 51.1 | 50.0 | 84.8 | 84.0 | 0.62 | 40.1 | 6.2 |
| Compara. Example 2 | 1.8 | 110.8 | 55.4 | 50.0 | 81.2 | 79.2 | 0.58 | 39.9 | 6.3 |

Note:
V2/V1: peripheral velocity of corrugated rollers/peripheral velocity of first drive rollers
V2/V3: peripheral velocity of corrugated rollers/peripheral velocity of second drive rollers
V1/V3: peripheral velocity of first drive rollers/peripheral velocity of second drive rollers
W1/W0: sheet width immediately before corrugated rollers/initial sheet width
W2/W0: sheet width after processing/initial sheet width As is apparent from the results in Table 1, the flexible sheets of Examples show little reduction in width from the initial width due to contraction compared with those of Comparative Examples. The flexible sheets of Examples also proved to be not inferior in stretchability to those of Comparative Examples, to have a substantial thickness with good cushioning properties and excellent feel to the touch.

INDUSTRIAL APPLICABILITY

According to the method for producing a flexible sheet of the invention, a sheet having high flexibility and good feel to the touch is obtained without involving width contraction.

The invention claimed is:
1. A method for producing a flexible sheet comprising a stretching step in which a base sheet is fed from between a pair of first drive rollers into the bite between a pair of intermeshing corrugated rollers to be stretched in the machine direction, the peripheral velocity V1 of the first drive rollers and the peripheral velocity V2 of the corrugated rollers having a relation of V1>V2, and the ratio of the peripheral velocity V2 of the corrugated rollers to the peripheral velocity V1 of the first drive rollers (V2/V1)*100, is 60% to 90%.

2. The method according to claim 1, wherein the base sheet to be fed into the bite of the pair of intermeshing corrugated rollers is under tension applied in the machine direction between the first drive rollers and the intermeshing corrugated rollers.

3. The method according to claim 1, further comprising a taking-off step in which the stretched base sheet is conveyed to the nip between a pair of second drive rollers and taken off from the pair of intermeshing corrugated rollers under tension applied by the pair of second drive rollers in the machine direction, the peripheral velocity V3 of the second drive rollers and the peripheral velocity V1 of the first drive rollers having a relation of V3>V1.

4. The method according to claim 1, wherein the pair of intermeshing corrugated rollers is configured to stretch the base sheet at a stretch ratio of 1.1 to 5.0.

5. The method according to claim 1, wherein the base sheet is nonwoven fabric containing elastic fibers and is processed by the stretching step to have stretchability in the machine direction.

* * * * *